(12) United States Patent
Saito et al.

(10) Patent No.: US 11,788,944 B2
(45) Date of Patent: Oct. 17, 2023

(54) MICROPARTICLE MEASURING APPARATUS WITH MEASUREMENT AND CLEANING MODES

(71) Applicant: SONY CORPORATION, Tokyo (JP)

(72) Inventors: Masahiro Saito, Tokyo (JP); Shingo Mouri, Tokyo (JP); Masahiko Nakamura, Miyagi (JP); Hidetaka Okamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 284 days.

(21) Appl. No.: 17/048,723

(22) PCT Filed: Mar. 12, 2019

(86) PCT No.: PCT/JP2019/009971
§ 371 (c)(1),
(2) Date: Oct. 19, 2020

(87) PCT Pub. No.: WO2019/207990
PCT Pub. Date: Oct. 31, 2019

(65) Prior Publication Data
US 2021/0172854 A1   Jun. 10, 2021

(30) Foreign Application Priority Data
Apr. 25, 2018   (JP) .................................. 2018-084546

(51) Int. Cl.
*G01N 15/14* (2006.01)

(52) U.S. Cl.
CPC ..... *G01N 15/1404* (2013.01); *G01N 15/1436* (2013.01); *G01N 2015/1409* (2013.01); *G01N 2015/1418* (2013.01)

(58) Field of Classification Search
CPC ........... G01N 15/1404; G01N 15/1436; G01N 2015/1409; G01N 2015/1418; G01N 15/1459
See application file for complete search history.

(56) References Cited

U.S. PATENT DOCUMENTS 4,683,212 A * 7/1987 Uffenheimer ...... G01N 15/1404
356/73
5,134,445 A * 7/1992 Toge ...................... G01N 35/08
356/336

(Continued)

FOREIGN PATENT DOCUMENTS

CN      103900944 A       7/2014
CN      105806767    *    7/2016  ......... G01N 15/1404

(Continued)

OTHER PUBLICATIONS

International Search Report and Written Opinion of PCT Application No. PCT/JP2019/009971, dated Jun. 18, 2019, 09 pages of ISRWO.

*Primary Examiner* — Michael P LaPage
(74) *Attorney, Agent, or Firm* — CHIP LAW GROUP

(57) ABSTRACT

To provide a technique that enables the risk of contamination to be reduced. Provided is a microparticle measuring apparatus including at least: a relay unit that enables a flow path through which microparticles flow and a cleaning fluid storage unit to communicate with each other; a sheath fluid tube that causes the flow path and a sheath fluid storage unit to communicate with each other; and a cleaning fluid tube that causes the relay unit and the cleaning fluid storage unit to communicate with each other, in which the relay unit includes a first connector that can be connected to a joint portion on the sheath fluid storage unit side of the sheath fluid tube.

17 Claims, 10 Drawing Sheets

(56) References Cited

U.S. PATENT DOCUMENTS

| | | | |
|---|---|---|---|
| 9,791,362 B2* | 10/2017 | Fox | G01N 15/14 |
| 2003/0143117 A1 | 7/2003 | Nagai et al. | |
| 2014/0087389 A1* | 3/2014 | Heller | G01N 21/6486 |
| | | | 435/7.1 |
| 2015/0010939 A1* | 1/2015 | Warner | G01N 15/0656 |
| | | | 435/287.1 |
| 2016/0084814 A1* | 3/2016 | Olson | G01N 33/1886 |
| | | | 435/288.7 |
| 2016/0377524 A1* | 12/2016 | Martin | G01N 15/1436 |
| | | | 73/864.81 |
| 2020/0324286 A1* | 10/2020 | Sakai | B01L 3/502715 |

FOREIGN PATENT DOCUMENTS

| | | |
|---|---|---|
| JP | 61-025040 A | 2/1986 |
| JP | 2003-287491 A | 10/2003 |
| JP | 2004-069512 A | 3/2004 |
| JP | 2007-046947 A | 2/2007 |
| WO | 2015/081242 A2 | 6/2015 |

\* cited by examiner

MICROPARTICLE MEASURING APPARATUS WITH MEASUREMENT AND CLEANING MODES

CROSS REFERENCE TO RELATED APPLICATIONS

This application is a U.S. National Phase of International Patent Application No. PCT/JP2019/009971 filed on Mar. 12, 2019, which claims priority benefit of Japanese Patent Application No. JP 2018-084546 filed in the Japan Patent Office on Apr. 25, 2018. Each of the above-referenced applications is hereby incorporated herein by reference in its entirety.

TECHNICAL FIELD

The present technology relates to a microparticle measuring apparatus.

BACKGROUND ART

At present, a technique called flow cytometry is used for analysis of biologically relevant microparticles such as cells and microorganisms. The flow cytometry is an analytical method for performing, for example, analysis of microparticles by applying light to microparticles flowing while being contained in a sheath fluid fed into a flow path, and detecting fluorescence or scattered light emitted from each microparticle. An apparatus to be used for the flow cytometry is called a flow cytometer.

For example, Patent Document 1 discloses, as the flow cytometer, "an apparatus including a flow path system for arranging cells stained with a fluorescent labeling reagent or the like in a row in a flow cell, an optical system for irradiating the cells with laser light and detecting scattered light or fluorescence, and a sorting system for controlling a direction of movement of droplets discharged into the space outside the flow cell". Patent Document 1 also discloses that a sheath fluid is supplied from a sheath fluid supply unit to the flow path system.

CITATION LIST

Patent Document

Patent Document 1: Japanese Patent Application Laid-Open No. 2007-46947

SUMMARY OF THE INVENTION

Problems to be Solved by the Invention

In order to avoid the risk of contamination in the flow cytometer, it is necessary to clean a sheath line that connects a sheath tank to the flow path system. Meanwhile, heretofore, the sheath line has been cleaned with a cleaning fluid poured into the sheath line from a point partway along the sheath line. Therefore, a part of the sheath line has remained uncleaned. Thus, the risk of contamination has not been eliminated.

Therefore, a main object of the present technology is to provide a technique that enables the risk of contamination to be reduced.

Solutions To Problems

In the present technology, provided is a microparticle measuring apparatus including at least:

a relay unit that enables a flow path through which microparticles flow and a cleaning fluid storage unit to communicate with each other;

a sheath fluid tube that causes the flow path and a sheath fluid storage unit to communicate with each other; and a cleaning fluid tube that causes the relay unit and the cleaning fluid storage unit to communicate with each other, in which the relay unit includes:

a first connector that can be connected to a joint portion on the sheath fluid storage unit side of the sheath fluid tube.

The microparticle measuring apparatus according to the present technology may further include a control unit that controls switching between a measurement mode and a cleaning mode.

In this case, the microparticle measuring apparatus according to the present technology may further include a first confirmation mechanism that confirms a connection between the first connector and the joint portion on the sheath fluid storage unit side of the sheath fluid tube, and the first confirmation mechanism may include an optical sensor. Furthermore, when the connection between the first connector and the joint portion on the sheath fluid storage unit side of the sheath fluid tube is confirmed by the first confirmation mechanism, switching to the cleaning mode may be performed in the control unit.

Moreover, the microparticle measuring apparatus according to the present technology may further include a rinse liquid tube that causes the relay unit and a rinse liquid storage unit to communicate with each other, in which the relay unit may enable the rinse liquid storage unit, the flow path, and the cleaning fluid storage unit to communicate with each other, and may further include a second connector that can be connected to a joint portion of the rinse liquid storage unit of the rinse liquid tube.

In this case, the microparticle measuring apparatus according to the present technology may further include a second confirmation mechanism that confirms a connection between the second connector and the joint portion on the rinse liquid storage unit side of the rinse liquid tube, and the second confirmation mechanism may include an optical sensor. Furthermore, when the connection between the first connector and the joint portion on the sheath fluid storage unit side of the sheath fluid tube is confirmed by the first confirmation mechanism and the connection between the second connector and the joint portion on the rinse liquid storage unit side of the rinse liquid tube is confirmed by the second confirmation mechanism, switching to the cleaning mode may be performed in the control unit.

Moreover, in the microparticle measuring apparatus according to the present technology, the first connector and the second connector may have different shapes.

In addition, the microparticle measuring apparatus according to the present technology may further include a display unit that displays a state of connection between the first connector and the joint portion on the sheath fluid storage unit side of the sheath fluid tube, and/or a state of connection between the second connector and the joint portion on the rinse liquid storage unit side of the rinse liquid tube.

Furthermore, in the microparticle measuring apparatus according to the present technology, a distance from a connecting portion of the sheath fluid storage unit with the sheath fluid tube to the second connector may be greater than a length of the sheath fluid tube.

Moreover, in the microparticle measuring apparatus according to the present technology, a distance from a connecting portion of the rinse liquid storage unit with the rinse liquid tube to the first connector may be greater than a length of the rinse liquid tube.

In addition, the cleaning fluid tube may include branch tubes that extend to a plurality of the cleaning fluid storage units. In this case, the microparticle measuring apparatus according to the present technology may further include a plurality of the cleaning fluid storage units.

Furthermore, the cleaning fluid may be a cleaning agent and/or a bactericide in the present technology. In this case, the cleaning agent may be an ethanol fluid, and the bactericide may be a sodium hypochlorite fluid and/or a paraformaldehyde fluid.

In the present technology, "microparticles" may include a wide range of particles. Examples of the "microparticles" include biologically relevant microparticles such as cells, microorganisms, and liposomes, and synthetic particles such as latex particles, gel particles, and industrial particles.

The biologically relevant microparticles include chromosomes, liposomes, mitochondria, organelles (cellular organelles), and the like that form various cells. Cells include animal cells (for example, hematopoietic cells or the like) and plant cells. Microorganisms include bacteria such as colon bacilli, viruses such as tobacco mosaic viruses, fungi such as yeast, and the like. Moreover, the biologically relevant microparticles also include biologically relevant macromolecules such as nucleic acids, proteins, and complexes thereof. Furthermore, the industrial particles may be, for example, organic or inorganic polymer materials, metals, or the like. The organic polymer materials include polystyrene, styrene-divinylbenzene, polymethylmethacrylate, and the like. The inorganic polymer materials include glass, silica, magnetic material, and the like. Metals include gold colloid, aluminum, and the like. The shape of these microparticles is generally spherical. However, microparticles may have a non-spherical shape, and the size, mass, and the like of microparticles are not particularly limited in the present technology.

Effects of the Invention

According to the present technology, it is possible to reduce the risk of contamination.

Note that the effects described herein are not necessarily restrictive, and any of the effects described in the present disclosure may be achieved.

MODE FOR CARRYING OUT THE INVENTION

Hereinafter, preferred embodiments for carrying out the present technology will be described with reference to the drawings.

The embodiments to be described below are examples of typical embodiments of the present technology, and the scope of the present technology should not be construed as being narrow on the basis of the embodiments. Note that description will be provided in the following order.

1. Microparticle Measuring Apparatus 100
   (1) Relay Unit 1
   (2) Control Unit 2
   (3) Flow Path R
   (4) Light Irradiation Unit 3
   (5) Detection Unit 4
   (6) Sorting Unit 5
   (7) Analysis Unit 6

(8) Storage Unit 7
(9) Display Unit 8
(10) Input Unit 9
(11) Insertion Unit 101
(12) Sample Feeding Unit 102
(13) Drainage Unit 103

1. Microparticle Measuring Apparatus 100

Figure 1:
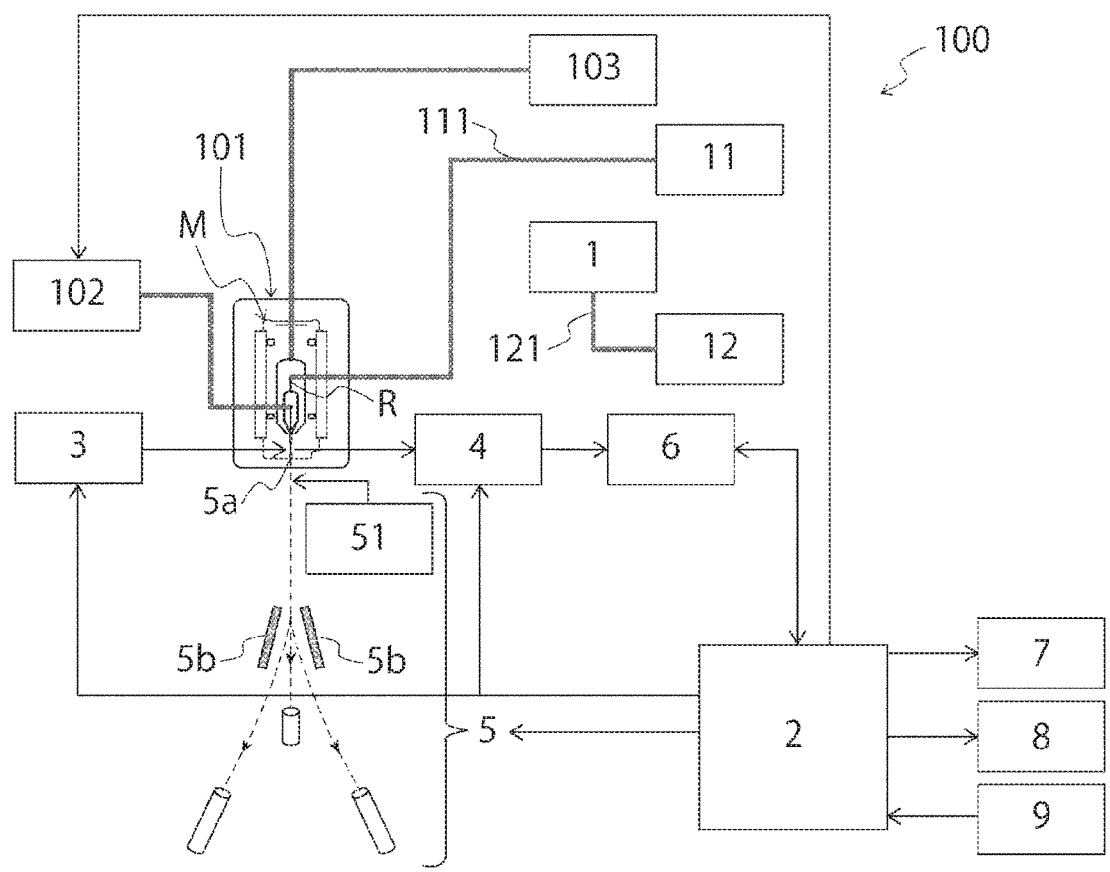
FIG. 1 is a schematic conceptual diagram showing a first embodiment of a microparticle measuring apparatus 100 according to the present technology in a measurement mode.
Figure 2:
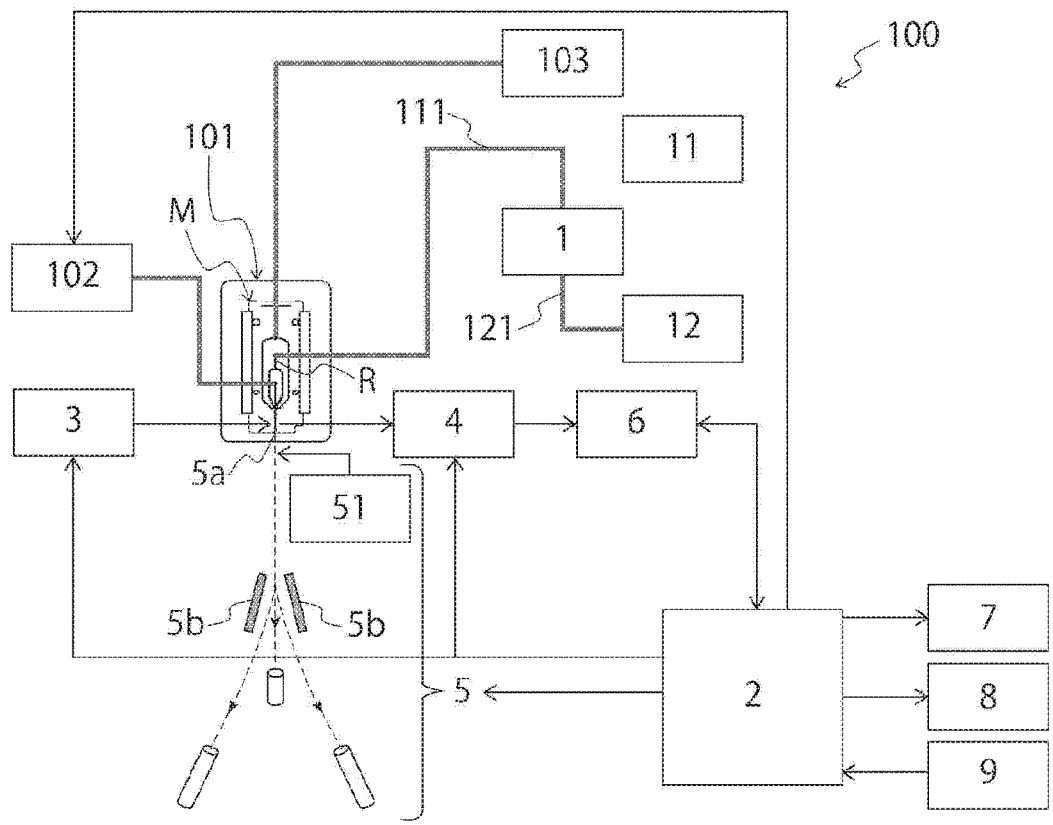
FIG. 2 is a schematic conceptual diagram showing the first embodiment of the microparticle measuring apparatus 100 according to the present technology in a cleaning mode.

FIG. 1 is a schematic conceptual diagram showing a first embodiment of a microparticle measuring apparatus 100 according to the present technology in a measurement mode. FIG. 2 is a schematic conceptual diagram showing the first embodiment of the microparticle measuring apparatus 100 according to the present technology in a cleaning mode. The microparticle measuring apparatus 100 according to the present technology includes at least a relay unit 1, a sheath fluid tube 111, and a cleaning fluid tube 121. Furthermore, the microparticle measuring apparatus 100 may include a control unit 2, a flow path R, a light irradiation unit 3, a detection unit 4, a sorting unit 5, an analysis unit 6, a storage unit 7, a display unit 8, an input unit 9, an insertion unit 101, a sample feeding unit 102, a drainage unit 103, and the like as necessary. Hereinafter, each unit will be described in detail.

(1) Relay Unit 1

The relay unit 1 enables the flow path R, through which microparticles flow, and a cleaning fluid storage unit 12 to communicate with each other. Furthermore, the relay unit 1 includes a first connector 1a connectable to a joint portion 111α on a sheath fluid storage unit 11 side of the sheath fluid tube 111 (see, for example, FIGS. 3 and 4 to be described later).

Note that the microparticle measuring apparatus 100 according to the present technology may include, in advance, the sheath fluid storage unit 11, the cleaning fluid storage unit 12, and a rinse liquid storage unit 13 to be described later. Alternatively, a detachable tank or the like may be attached when necessary to be used as each storage unit. Furthermore, it is also possible to use an external tank or the like as each storage unit.

The microparticle measuring apparatus 100 according to the present technology can switch between the measurement mode and the cleaning mode. Enabling such mode switching improves usability.

Figure 3:
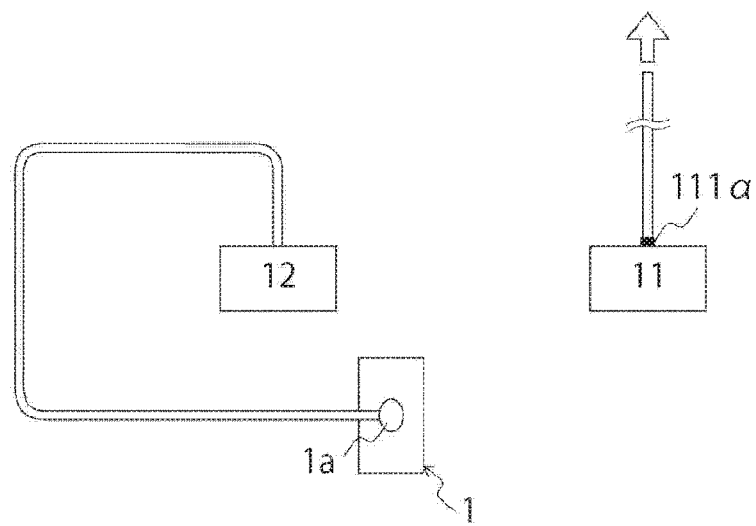
FIG. 3 is a schematic conceptual diagram schematically showing the state of connection of a sheath fluid tube 111 and a cleaning fluid tube 121 to a relay unit 1 in the first embodiment in the measurement mode.

Specifically, the measurement mode refers to, for example, a state in which the detection unit 4 to be described later performs detection in a state in which a sheath fluid flows from the sheath fluid storage unit 11 into the flow path R through which microparticles flow. FIG. 3 shows the state of connection of the sheath fluid tube 111 and the cleaning fluid tube 121 to the relay unit 1 in the first embodiment in the measurement mode.

In the measurement mode, the joint portion 111α on the sheath fluid storage unit 11 side of the sheath fluid tube 111 is connected to the sheath fluid storage unit 11, as shown in FIG. 3. The sheath fluid flows into the flow path R through the sheath fluid tube 111. Note that since no cleaning fluid is used in the measurement mode, the cleaning fluid storage unit 12, the cleaning fluid tube 121, and the relay unit 1 are connected to each other, and are separated from the other part.

Figure 4:
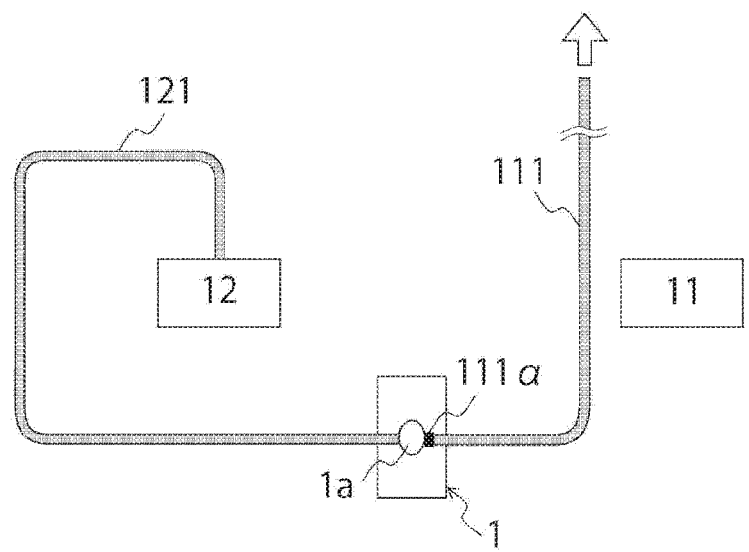
FIG. 4 is a schematic conceptual diagram schematically showing the state of connection of the sheath fluid tube 111 and the cleaning fluid tube 121 to the relay unit 1 in the first embodiment in the cleaning mode.

Meanwhile, the cleaning mode refers to, for example, a state in which the inside of the sheath fluid tube 111 is cleaned with a cleaning fluid flowing from the cleaning fluid storage unit 12 through the entire sheath fluid tube 111 to the flow path R. FIG. 4 shows the state of connection of the sheath fluid tube 111 and the cleaning fluid tube 121 to the relay unit 1 in the first embodiment in the cleaning mode.

In the cleaning mode, the sheath fluid tube 111 is removed together with the joint portion 111α from the sheath fluid storage unit 11, and the joint portion 111α on the sheath fluid storage unit 11 side of the sheath fluid tube 111 is connected to the first connector 1a provided in the relay unit 1, as shown in FIG. 4. In this state, the cleaning fluid is sent from the cleaning fluid storage unit 12 through the sheath fluid tube 111 to the flow path R (see FIG. 2) by way of the relay 1.

Heretofore, a switching member such as a valve has been used for switching from the inflow of the sheath fluid to the inflow of the cleaning fluid at a point partway along the sheath fluid tube, so that the flow of the sheath fluid has been stopped and the cleaning fluid has been caused to flow to clean a part of the sheath fluid tube. Therefore, the other part of the sheath fluid tube corresponding to a section between the switching member and the sheath fluid storage unit has not been cleaned with the cleaning fluid, and the risk of contamination has not been completely eliminated.

Meanwhile, in the present technology, the relay unit 1 includes the first connector 1a. As a result of connecting the first connector 1a to the joint portion 111α on the sheath fluid storage unit 11 side of the sheath fluid tube 111, it is possible to cause the cleaning fluid to flow through the entire sheath fluid tube 111 that extends from the sheath fluid storage unit 11 to the flow path R. Therefore, it is possible to avoid a situation in which a part of the sheath fluid tube remains uncleaned as in the conventional technique. As a result, it is possible to eliminate the risk of contamination due to an uncleaned portion of the sheath fluid tube 111.

The microparticle measuring apparatus 100 according to the present technology may include a first confirmation mechanism that confirms a connection between the first connector 1a and the joint portion 111α on the sheath fluid storage unit 11 side of the sheath fluid tube 111. As a result, it can be confirmed whether or not the connection has been surely established. It is thus possible to avoid human errors such as an error in which a user makes wrong insertion of the joint portion 111α on the sheath fluid storage unit 11 side of the sheath fluid tube 111.

The specific configuration of the first confirmation mechanism is not particularly limited. For example, although not shown, the first confirmation mechanism can be configured as a physical mechanism in which a pin or the like is provided on a protruding and recessed shape portion of the first connector 1a in such a way as to be pressed down at the time of connection so that it can be confirmed that the connection has been established.

Figure 5:
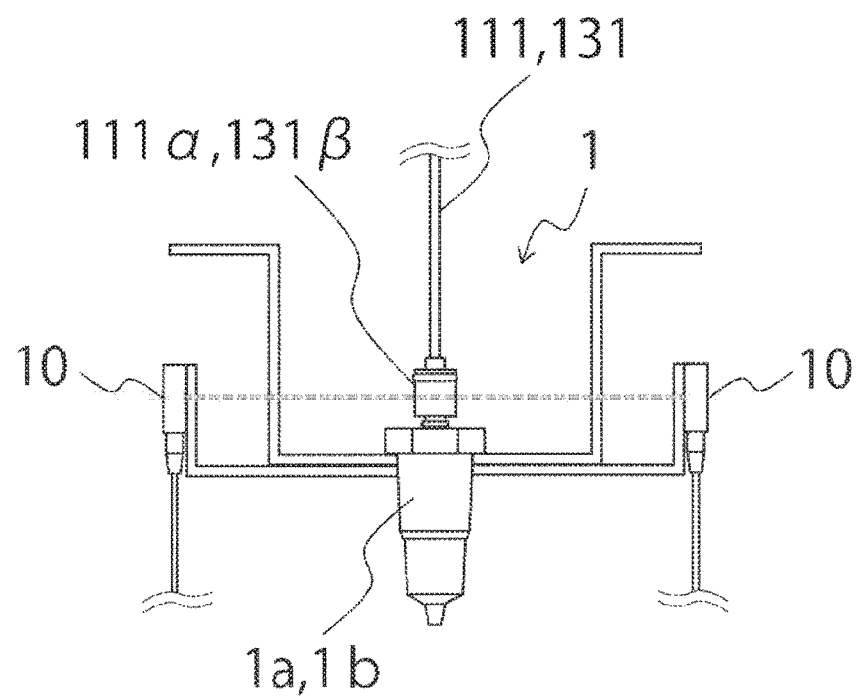
FIG. 5 is a schematic conceptual diagram schematically showing examples of a first confirmation mechanism and a second confirmation mechanism.

In the present technology, it is preferable that the first confirmation mechanism be an optical mechanism including an optical sensor 10. Specifically, for example, the optical sensor 10 can be provided at a position where the optical sensor 10 senses a connection between the first connector 1a and the joint portion 111α of the sheath fluid tube 111, as shown in FIG. 5. As a result, it is possible to easily and surely confirm the connection between the first connector 1a and the joint portion 111α on the sheath fluid storage unit 11 side of the sheath fluid tube 111.

The cleaning fluid that can be used in the microparticle measuring apparatus 100 according to the present technology is not particularly limited, and one or more publicly-known cleaning fluids can be freely selected and used. For example, it is possible to use a cleaning agent included in a cleaning agent, a bactericide, and the like.

The cleaning agent is not particularly limited. However, for example, a detergent, ethanol fluid, or the like can be used, and it is particularly preferable to use an ethanol fluid.

Note that the ethanol fluid includes concepts such as an ethanol undiluted solution, an ethanol diluted solution, and an ethanol aqueous solution.

The bactericide is not particularly limited, either. For example, it is possible to use a sodium hypochlorite fluid, a paraformaldehyde fluid, or the like with stronger bactericidal action than the cleaning agent, and it is particularly preferable to use a sodium hypochlorite fluid. Note that the sodium hypochlorite fluid includes concepts such as a sodium hypochlorite diluted solution and a sodium hypochlorite aqueous solution. In addition, the paraformaldehyde fluid includes concepts such as a paraformaldehyde diluted solution and a paraformaldehyde aqueous solution.

Figure 6:
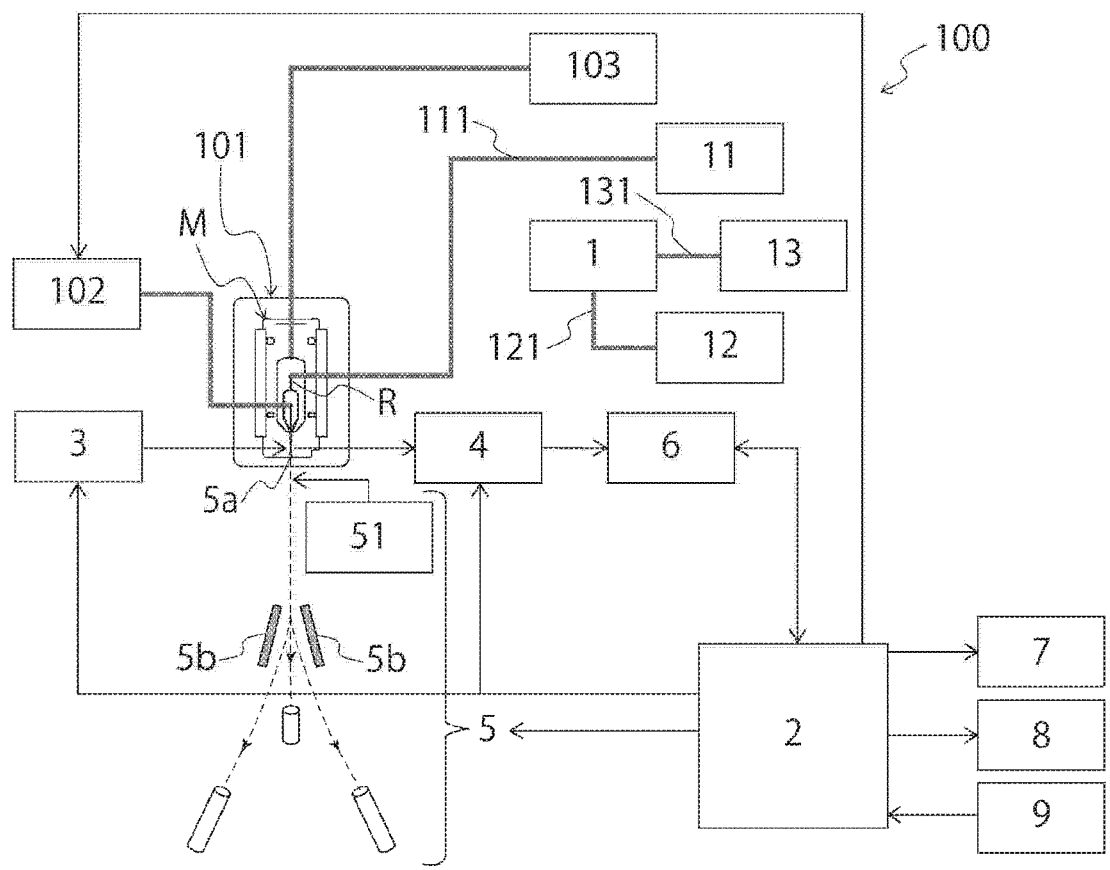
FIG. 6 is a schematic conceptual diagram showing a second embodiment of the microparticle measuring apparatus 100 according to the present technology in the measurement mode.
Figure 7:
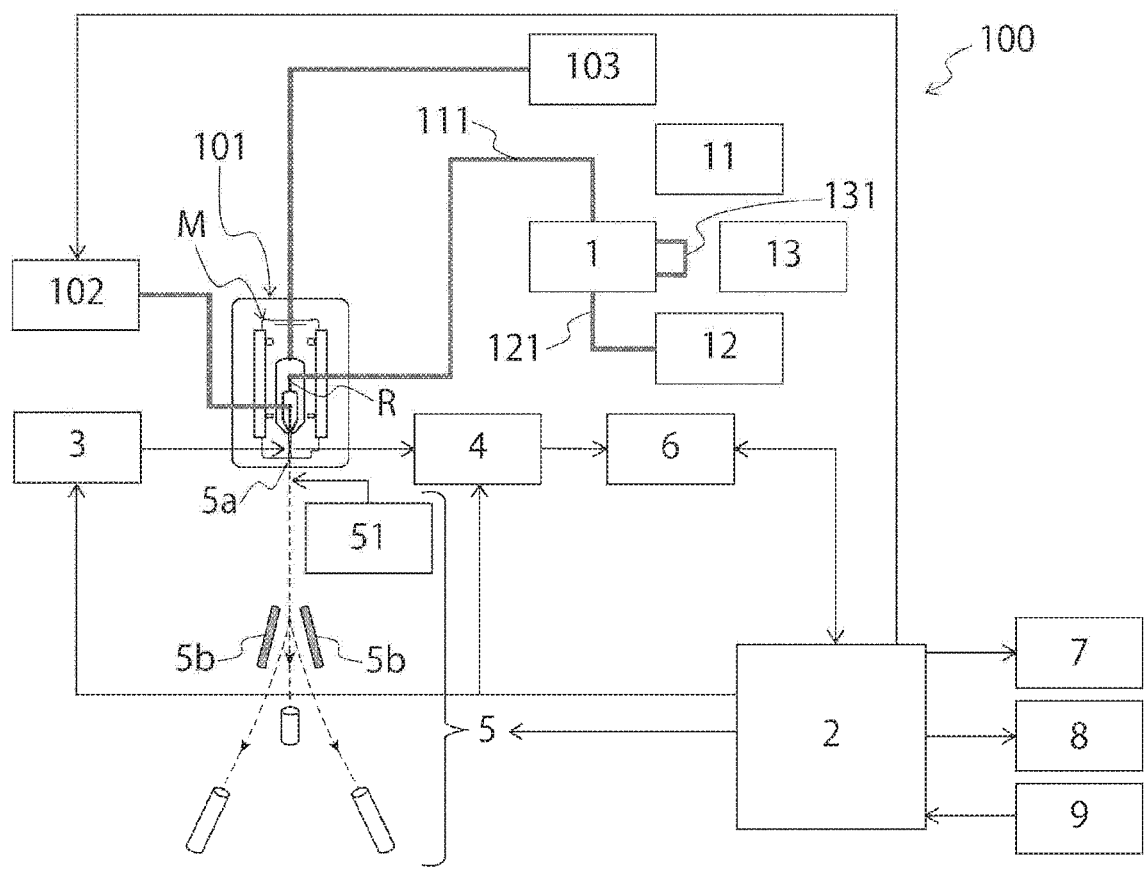
FIG. 7 is a schematic conceptual diagram showing the second embodiment of the microparticle measuring apparatus 100 according to the present technology in the cleaning mode.
Figure 8:
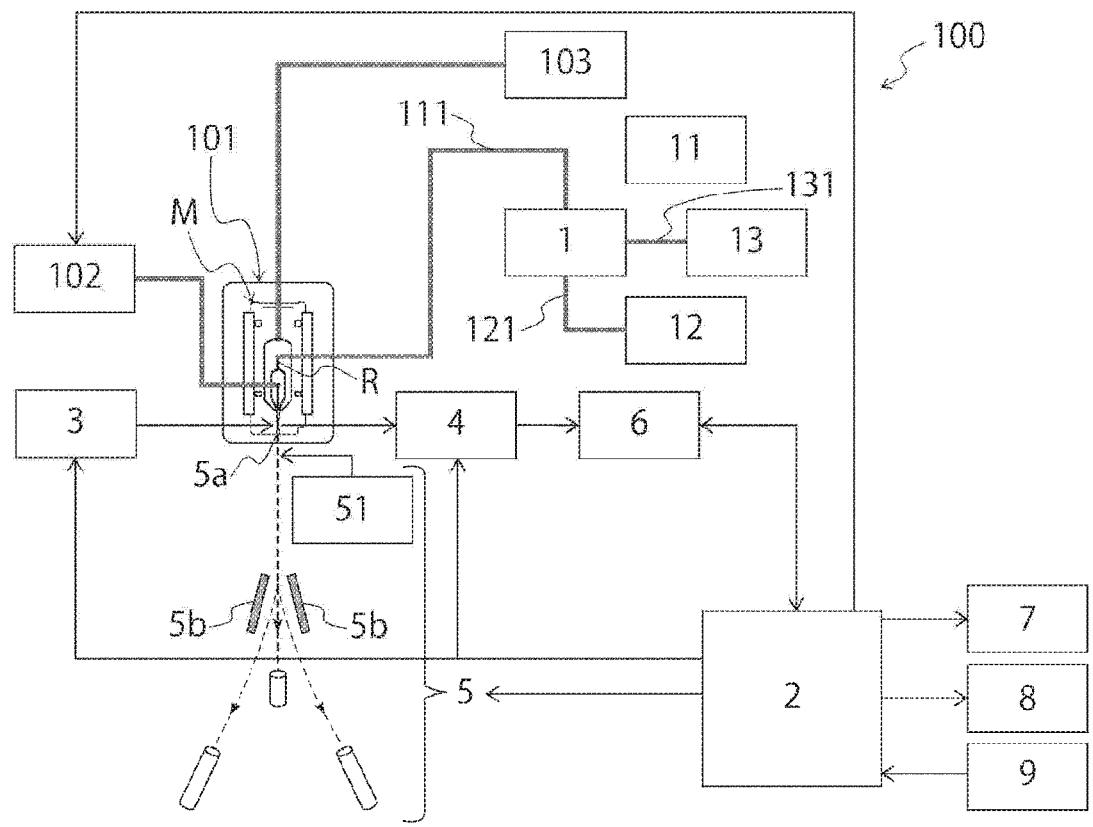
FIG. 8 is a schematic conceptual diagram showing the second embodiment of the microparticle measuring apparatus 100 according to the present technology in a rinse mode.

FIG. 6 is a schematic conceptual diagram showing a second embodiment of the microparticle measuring apparatus 100 according to the present technology in the measurement mode. FIG. 7 is a schematic conceptual diagram showing the second embodiment of the microparticle measuring apparatus according to the present technology in the cleaning mode. FIG. 8 is a schematic conceptual diagram showing the second embodiment of the microparticle measuring apparatus according to the present technology in a rinse mode. As shown as the second embodiment in FIGS. 6 to 8, the microparticle measuring apparatus 100 according to the present technology may further include a rinse liquid tube 131 that causes the relay unit 1 and the rinse liquid storage unit 13 to communicate with each other. In this case, the relay unit 1 enables the rinse liquid storage unit 13, the flow path R, and the cleaning fluid storage unit 12 to communicate with each other. Furthermore, the relay unit 1 may further include a second connector 1b connectable to a joint portion 131β of the rinse liquid storage unit 13 of the rinse liquid tube 131 (see, for example, FIGS. 9 to 11 to be described later). This allows a rinse liquid to flow through the sheath fluid tube 111, improving usability.

The type of rinse liquid that can be used in the microparticle measuring apparatus 100 according to the present technology is not particularly limited, and one or more publicly-known rinse liquids can be freely selected and used. Specific examples of the rinse liquid include pure water and purified water.

Figure 9:
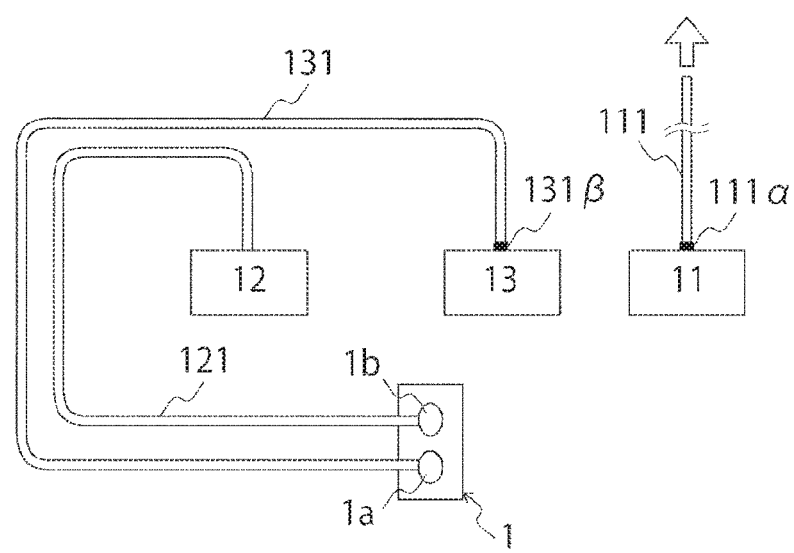
FIG. 9 is a schematic conceptual diagram schematically showing the state of connection of the sheath fluid tube 111, the cleaning fluid tube 121, and a rinse liquid tube 131 to the relay unit 1 in the second embodiment in the measurement mode.

FIG. 9 is a schematic conceptual diagram schematically showing the state of connection of the sheath fluid tube 111, the cleaning fluid tube 121, and the rinse liquid tube 131 to the relay unit 1 in the second embodiment in the measurement mode. In the measurement mode, the joint portion 111α on the sheath fluid storage unit 11 side of the sheath fluid tube 111 is connected to the sheath fluid storage unit 11, as shown in FIG. 9. The sheath fluid flows into the flow path R through the sheath fluid tube 111. Note that since no cleaning fluid or rinse liquid is used in the measurement mode, the cleaning fluid storage unit 12, the cleaning fluid tube 121, the relay unit 1, the rinse liquid storage unit 13, and the rinse liquid tube 131 are connected to each other, and are separated from the other part. In this state, the sheath fluid flows from the sheath fluid storage unit 11 into the flow path R through which microparticles flow, and the detection unit 4 to be described later performs various detections.

Figure 10:
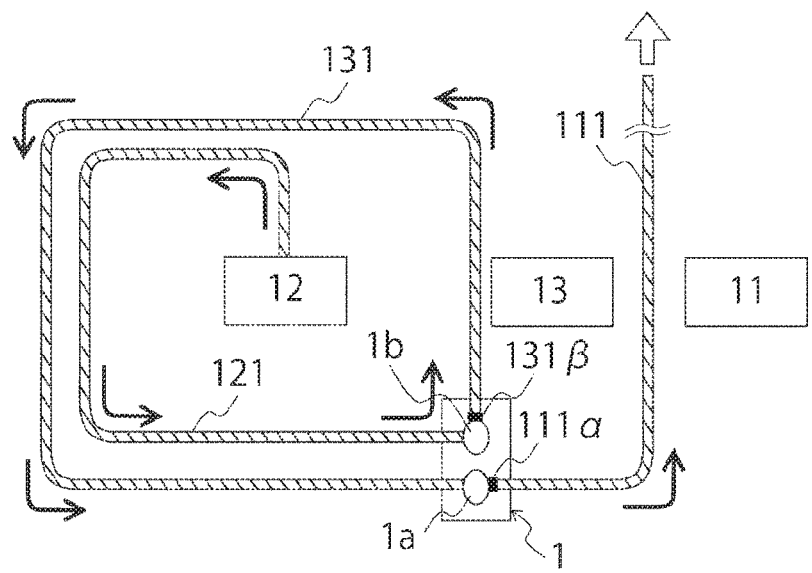
FIG. 10 is a schematic conceptual diagram schematically showing the state of connection of the sheath fluid tube 111, the cleaning fluid tube 121, and the rinse liquid tube 131 to the relay unit 1 in the second embodiment in the cleaning mode.

FIG. 10 is a schematic conceptual diagram schematically showing the state of connection of the sheath fluid tube 111, the cleaning fluid tube 121, and the rinse liquid tube 131 to the relay unit 1 in the second embodiment in the cleaning mode. In the cleaning mode, the sheath fluid tube 111 is removed together with the joint portion 111α from the sheath fluid storage unit 11, and the joint portion 111α on the sheath fluid storage unit 11 side of the sheath fluid tube 111 is connected to the first connector 1a provided in the relay unit 1, as shown in FIG. 10. Moreover, the rinse liquid tube 131 is removed together with the joint portion 131β from the rinse liquid storage unit 31, and the joint portion 131β on the rinse liquid storage unit 31 side of the rinse liquid tube 131 is connected to the second connector 1b provided in the relay unit 1. In this state, first, the cleaning fluid is sent from the cleaning fluid storage unit 12 through the cleaning fluid tube 121, and then flows through the rinse liquid tube 131 by way of the second connector 1b of the relay 1. Subsequently, the cleaning fluid flows through the sheath fluid tube 111 to the flow path R (see FIG. 7) by way of the first connector 1a of the relay unit 1 (see arrows in FIG. 10).

As described above, in the second embodiment of the microparticle measuring apparatus 100 according to the present technology, the cleaning fluid flows through not only the sheath fluid tube 111 but also the rinse liquid tube 131 in the cleaning mode. Thus, it is also possible to clean the rinse liquid tube.

In the second embodiment, the microparticle measuring apparatus 100 according to the present technology may include a second confirmation mechanism that confirms a connection between the second connector 1b and the joint portion 131β on the rinse liquid storage unit 13 side of the rinse liquid tube 131. As a result, it can be confirmed whether or not the connection has been surely established. It is thus possible to avoid human errors such as an error in which a user makes wrong insertion of the joint portion 131β on the rinse liquid storage unit 13 side of the rinse liquid tube 131.

The specific configuration of the second confirmation mechanism is not particularly limited, and the second confirmation mechanism can be configured as a physical mechanism, as with the first confirmation mechanism. However, in the present technology, it is preferable that the second confirmation mechanism also be an optical mechanism including the optical sensor 10. Specifically, for example, the optical sensor 10 can be provided at a position where the optical sensor 10 senses a connection between the second connector 1b and the joint portion 131β of the rinse liquid tube 131, as shown in FIG. 5 described above. As a result, it is possible to easily and surely confirm the connection between the second connector 1b and the joint portion 131β of the rinse liquid tube 131.

In the second embodiment of the microparticle measuring apparatus 100 according to the present technology, the first connector 1a and the second connector 1b can be formed in different shapes. Specifically, the first connector 1a can be formed in a shape such that the first connector 1a can be connected to the joint portion 111α of the sheath fluid tube 111, but cannot be connected to the joint portion 131β of the rinse liquid tube 131. In addition, the second connector 1b can be formed in a shape such that the second connector 1b can be connected to the joint portion 131β of the rinse liquid tube 131, but cannot be connected to the joint portion 111α of the sheath fluid tube 111. As a more specific example, the first connector 1a and the second connector 1b can be formed such that the first connector 1a and the second connector 1b have reverse protruding and recessed shape portions so as not to allow the joint portion 111α of the sheath fluid tube 111 or the joint portion 131β of the rinse liquid tube 131 to be inserted into the wrong connector. As a result of forming the first connector 1a and the second connector 1b in different shapes, it is possible to avoid human errors such as an error in which a user makes wrong insertion of the joint portion 111α of the sheath fluid tube 111 and the joint portion 131β of the rinse liquid tube 131.

In addition, designing the tubes such that each tube does not have a length sufficient to reach the wrong connector makes it possible to avoid human errors such as an error in which a user makes wrong insertion of the joint portion 111α of the sheath fluid tube 111 and the joint portion 131β of the rinse liquid tube 131. Specifically, the sheath fluid tube 111 is designed such that the distance from a connecting portion of the sheath fluid storage unit 11 with the sheath fluid tube to the second connector 1b is greater than the length of the sheath fluid tube 111. As a result, it is possible to prevent the joint portion 111α of the sheath fluid tube 111 from being mistakenly inserted into the second connector 1b. Furthermore, the rinse liquid tube 131 is designed such that the distance from a connecting portion of the rinse liquid storage unit 13 with the rinse liquid tube 131 to the first connector 1a is greater than the length of the rinse liquid tube 131. As a result, it is possible to prevent the joint portion 131β of the rinse liquid tube 131 from being mistakenly inserted into the first connector 1a.

Figure 11:
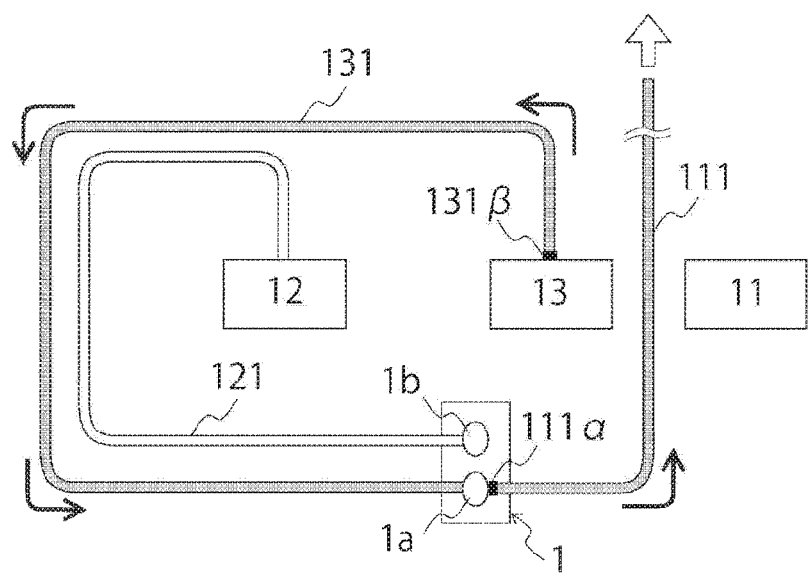
FIG. 11 is a schematic conceptual diagram schematically showing the state of connection of the sheath fluid tube 111, the cleaning fluid tube 121, and the rinse liquid tube 131 to the relay unit 1 in the second embodiment in the rinse mode.

FIG. 11 is a schematic conceptual diagram schematically showing the state of connection of the sheath fluid tube 111, the cleaning fluid tube 121, and the rinse liquid tube 131 to the relay unit 1 in the second embodiment in the rinse mode. In the rinse mode, the sheath fluid tube 111 is removed together with the joint portion 111α from the sheath fluid storage unit 11, and the joint portion 111α on the sheath fluid storage unit 11 side of the sheath fluid tube 111 is connected to the first connector 1a provided in the relay unit 1, as shown in FIG. 11. In this state, first, the rinse liquid is sent from the rinse liquid storage unit 13 through the rinse liquid tube 131, and then flows through the sheath fluid tube 111 to the flow path R (see FIG. 8) by way of the first connector 1a of the relay 1 (see arrows in FIG. 11).

Figure 12:
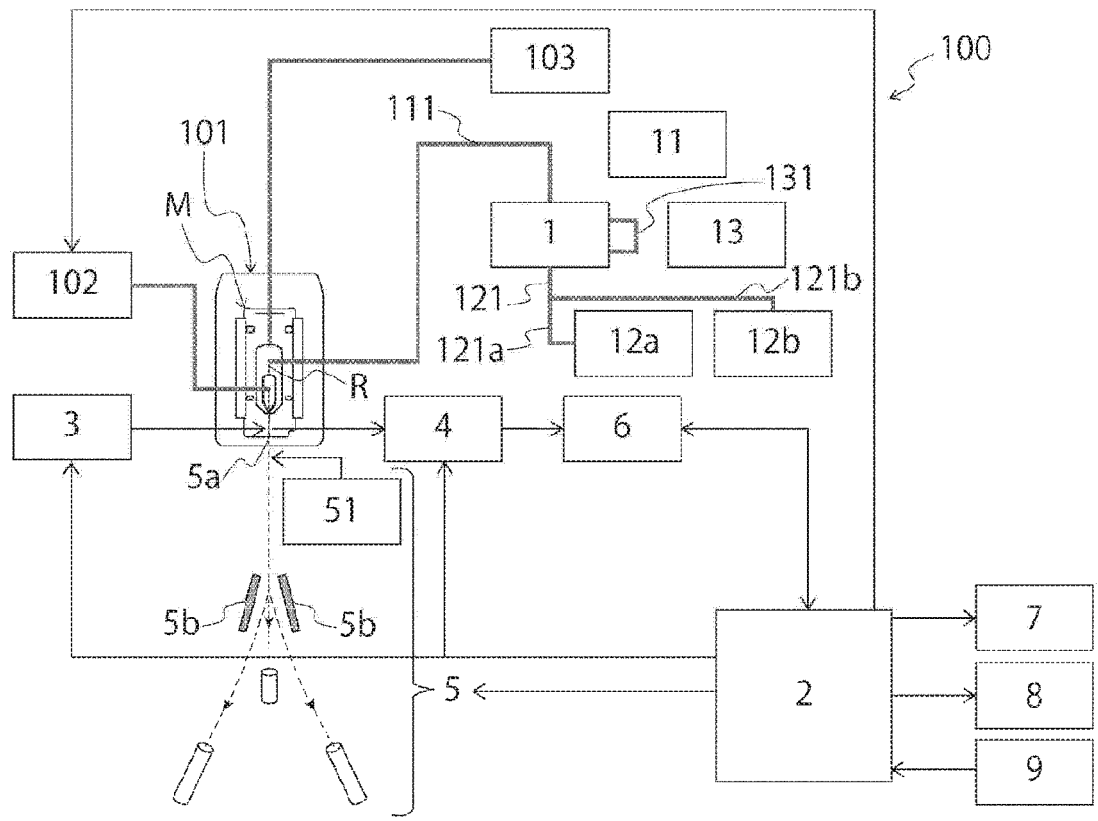
FIG. 12 is a schematic conceptual diagram showing a third embodiment of the microparticle measuring apparatus 100 according to the present technology in the cleaning mode.

FIG. 12 is a schematic conceptual diagram showing a third embodiment of the microparticle measuring apparatus 100 according to the present technology in the cleaning mode. As in the third embodiment shown in FIG. 12, the cleaning fluid tube 121 of the microparticle measuring apparatus 100 according to the present technology may include a plurality of branch tubes 121a and 121b extending to a plurality of the cleaning fluid storage units 12. In this case, the microparticle measuring apparatus 100 according to the present technology may include a plurality of the cleaning fluid storage units 12 (see reference signs 12a and 12b in FIG. 12). As a result, it is possible to use different types of cleaning fluid according to the purpose.

Figure 13:
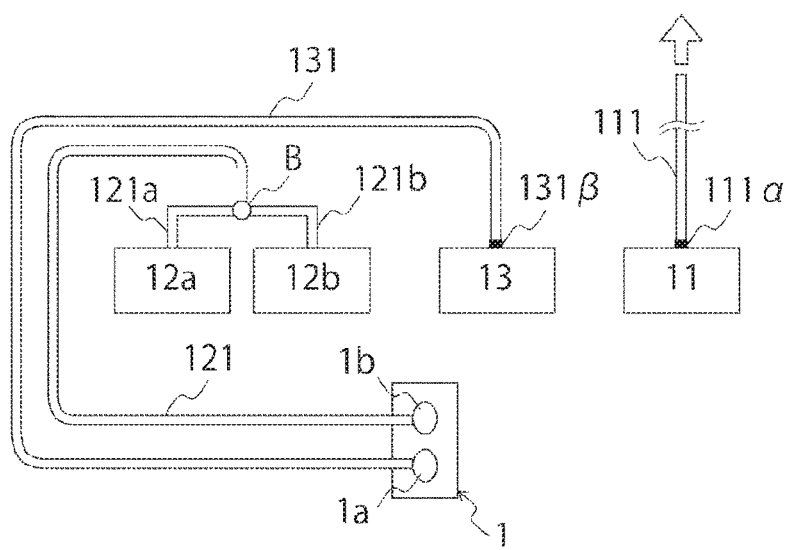
FIG. 13 is a schematic conceptual diagram schematically showing the state of connection of the sheath fluid tube 111, the cleaning fluid tube 121, and the rinse liquid tube 131 to the relay unit 1 in the third embodiment in the measurement mode.

FIG. 13 is a schematic conceptual diagram schematically showing the state of connection of the sheath fluid tube 111, the cleaning fluid tube 121, and the rinse liquid tube 131 to the relay unit 1 in the third embodiment in the measurement mode. In the measurement mode, the joint portion 111α on the sheath fluid storage unit 11 side of the sheath fluid tube 111 is connected to the sheath fluid storage unit 11, as shown in FIG. 13. The sheath fluid flows into the flow path R through the sheath fluid tube 111. Note that since no cleaning fluid or rinse liquid is used in the measurement mode, the cleaning fluid storage units 12a and 12b, the cleaning fluid tubes 121, 121a, and 121b, the relay unit 1, the rinse liquid storage unit 13, and the rinse liquid tube 131 are connected to each other, and are separated from the other part. In this state, the sheath fluid flows from the sheath fluid storage unit 11 into the flow path R through which microparticles flow, and the detection unit 4 to be described later performs various detections.

Figure 14:
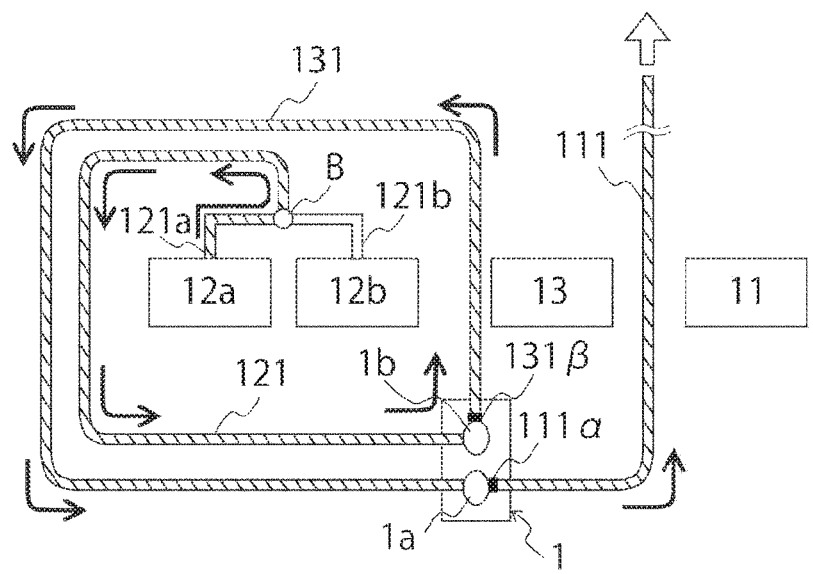
FIG. 14 is a schematic conceptual diagram schematically showing the state of connection of the sheath fluid tube 111, the cleaning fluid tube 121, and the rinse liquid tube 131 to the relay unit 1 in the third embodiment in the cleaning mode.
Figure 15:
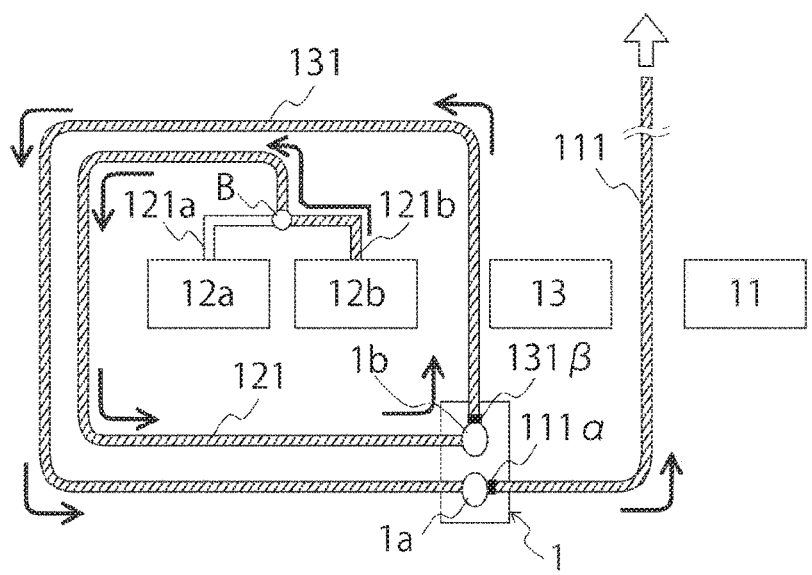
FIG. 15 is a schematic conceptual diagram schematically showing the state of connection of the sheath fluid tube 111, the cleaning fluid tube 121, and the rinse liquid tube 131 to the relay unit 1 in the third embodiment in the cleaning mode.

FIG. 14 and FIG. 15 are schematic conceptual diagrams schematically showing the states of connection of the sheath fluid tube 111, the cleaning fluid tube 121, and the rinse liquid tube 131 to the relay unit 1 in the third embodiment in the cleaning mode. In the cleaning mode, the sheath fluid tube 111 is removed together with the joint portion 111α from the sheath fluid storage unit 11, and the joint portion 111α on the sheath fluid storage unit 11 side of the sheath fluid tube 111 is connected to the first connector 1a provided in the relay unit 1, as shown in FIGS. 14 and 15. Moreover, the rinse liquid tube 131 is removed together with the joint portion 131β from the rinse liquid storage unit 31, and the joint portion 131β on the rinse liquid storage unit 31 side of the rinse liquid tube 131 is connected to the second connector 1b provided in the relay unit 1. In this state, the cleaning fluid is sent from the cleaning fluid storage unit 12a or 12b through the cleaning fluid tube 121a or 121b and the cleaning fluid tube 121, and then flows through the rinse liquid tube 131 by way of the second connector 1b of the relay 1. Subsequently, the cleaning fluid flows through the sheath fluid tube 111 to the flow path R (see FIG. 12) by way of the first connector 1a of the relay unit 1 (see arrows in FIGS. 14 and 15).

In the second embodiment of the microparticle measuring apparatus 100 according to the present technology, it is also possible to provide, for example, a flow direction control mechanism such as a valve B at the boundary between the cleaning fluid tube 121 and the branch tubes 121a and 121b so as to perform control such that a cleaning fluid that suits the purpose is sent from either the cleaning fluid storage unit 12a or 12b in which the cleaning fluid is stored.

Figure 16:
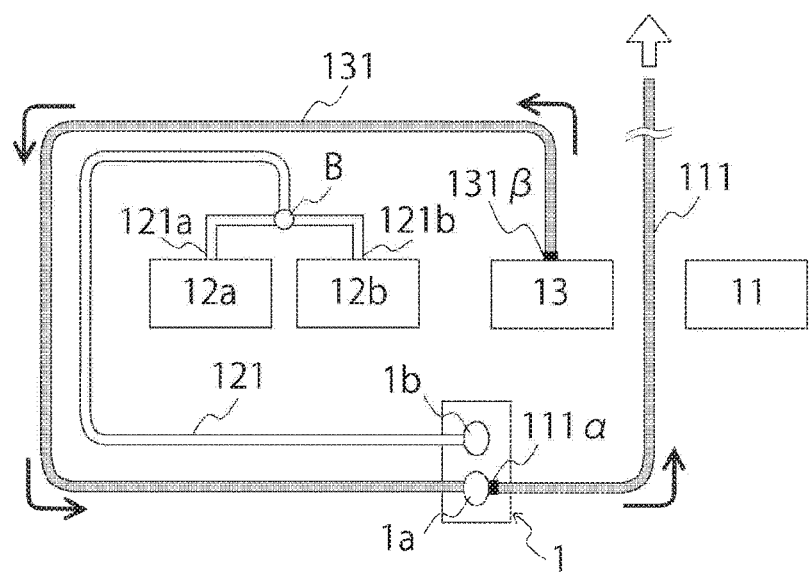
FIG. 16 is a schematic conceptual diagram schematically showing the state of connection of the sheath fluid tube 111, the cleaning fluid tube 121, and the rinse liquid tube 131 to the relay unit 1 in the third embodiment in the rinse mode.

FIG. 16 is a schematic conceptual diagram schematically showing the state of connection of the sheath fluid tube 111, the cleaning fluid tube 121, and the rinse liquid tube 131 to the relay unit 1 in the third embodiment in the rinse mode. In the rinse mode, the sheath fluid tube 111 is removed together with the joint portion 111α from the sheath fluid storage unit 11, and the joint portion 111α on the sheath fluid storage unit 11 side of the sheath fluid tube 111 is connected to the first connector 1a provided in the relay unit 1, as shown in FIG. 16. In this state, first, the rinse liquid is sent from the rinse liquid storage unit 13 through the rinse liquid tube 131, and then flows through the sheath fluid tube 111 to the flow path R (not shown) by way of the first connector 1a of the relay 1 (see arrows in FIG. 16).

The first connector 1a and the second connector 1b in the relay unit 1 of the microparticle measuring apparatus 100 according to the present technology may each include a check valve. As a result of providing the check valve, it is possible to prevent the backflow of the cleaning fluid, the rinse liquid, or the like.

(2) Control Unit 2

The microparticle measuring apparatus 100 according to the present technology may further include the control unit 2 as necessary. For example, the control unit 2 controls switching between the measurement mode, the cleaning mode, and the rinse mode as necessary.

For example, in the first embodiment shown in FIGS. 1 to 4, the control unit 2 can perform control in such a way as to switch to the cleaning mode when a connection between the first connector 1a and the joint portion 111α of the sheath fluid tube 111 is confirmed by the first confirmation mechanism. As a result, it is possible to prevent the mode from being switched to the cleaning mode before the joint portion 111α of the sheath fluid tube 111 is inserted into the first connector 1a, so that it is possible to prevent, for example, the cleaning fluid from spilling into the apparatus.

Furthermore, for example, in the second embodiment shown in FIGS. 6 to 11, the control unit 2 can perform control in such a way as to switch to the cleaning mode when the first confirmation mechanism confirms a connection between the first connector 1a and the joint portion 111α of the sheath fluid tube 111 or the second confirmation mechanism confirms a connection between the second connector 1b and the joint portion 131β of the rinse liquid tube 131, or when both the first confirmation mechanism and the second confirmation mechanism confirm the connections described above. As a result, it is possible to prevent the mode from being switched to the cleaning mode before the joint portion 111α of the sheath fluid tube 111 is inserted into the first connector 1a or the joint portion 131β of the rinse liquid tube 131 is inserted into the second connector 1b, so that it is possible to prevent, for example, the cleaning fluid from spilling into the apparatus.

Furthermore, even in a case where the first connector 1a is mistakenly connected to the joint portion 131β of the rinse liquid tube 131, or a case where the second connector 1b is mistakenly connected to the joint portion 111α of the sheath fluid tube 111, it is possible to prevent each tube from having a wrong liquid flowing therethrough since the operation in the cleaning mode is blocked.

In the microparticle measuring apparatus 100 according to the present technology, the control unit 2 can control each unit of the microparticle measuring apparatus 100 in addition to performing control in such a way as to switch between the measurement mode, the cleaning mode, and the rinse mode.

The control unit 2 may be separately arranged for each unit of the microparticle measuring apparatus 100, or may be provided outside the microparticle measuring apparatus 100. For example, the control unit 2 may be implemented by a personal computer or a CPU. The control unit 2 can also be stored as a program in hardware resources including a recording medium (for example, a non-volatile memory (USB flash drive), an HDD, a CD, or the like) and the like, and be implemented by a personal computer or a CPU. Furthermore, the control unit 2 may be connected to each unit of the microparticle measuring apparatus 100 via a network.

(3) Flow Path R

In the microparticle measuring apparatus 100 according to the present technology, it is possible to analyze or sort microparticles by detecting optical information obtained from the microparticles aligned in a row in the flow cell (flow path R).

The flow path R may be provided in advance in the microparticle measuring apparatus 100. However, it is also possible to install a commercially available flow path R, a disposable chip M including the flow path R provided therein, or the like in the microparticle measuring apparatus 100 and perform analysis or sorting.

The form of the flow path R is not particularly limited, and can be freely designed. The flow path R is not limited to the flow path R formed in the chip M including two-dimensional or three-dimensional plastic, glass, or the like as shown in FIG. 1. For example, although not shown, a flow path R to be used in the conventional flow cytometer can also be used in the microparticle measuring apparatus 100.

Furthermore, the width, depth, and cross-sectional shape of the flow path R are not particularly limited, and can be freely designed as long as the flow path R has a shape that enables a laminar flow to be formed. For example, a micro-flow path having a width of 1 mm or less can also be used for the flow cytometer. In particular, a micro-flow path having a width of approximately 10 μm or more to 1 mm or less is more suitable for use in the microparticle measuring apparatus 100 according to the present technology.

Microparticles that flow through the flow path R can be labeled with one or more dyes such as fluorescent dyes. In this case, examples of fluorescent dyes that can be used in the present technology include Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-diamidino-2-phenylindole (DAPI), Cy3, Cy5, Cy7, Brilliant Violet (BV421), and the like.

(4) Light Irradiation Unit 3

The microparticle measuring apparatus 100 according to the present technology may further include the light irradiation unit 3 as necessary. The light irradiation unit 3 irradiates microparticles to be measured, which flow through the flow path R, with light. In the microparticle measuring apparatus 100 according to the present technology, the light irradiation unit 2 is not essential, and it is also possible to apply light to microparticles flowing through the flow path R by using an external light irradiation device or the like.

The type of light to be applied by the light irradiation unit 3 is not particularly limited. However, in order to surely cause fluorescence or scattered light to be emitted from particles, it is preferable to use light having a constant direction, wavelength, and intensity. Specific examples thereof include lasers, LEDs, and the like. In the case of using a laser, the type thereof is not particularly limited. However, it is possible to use one of the following, or freely combine and use two or more of the following: an argon-ion (Ar) laser, a helium-neon (He-Ne) laser, a dye laser, a krypton (Cr) laser, a semiconductor laser, a solid-state laser in which a semiconductor laser and a wavelength conversion optical element are combined, and the like.

(5) Detection Unit 4

The microparticle measuring apparatus 100 according to the present technology may further include the detection unit 4 as necessary. The detection unit 4 detects light from the microparticles. In the microparticle measuring apparatus 100 according to the present technology, the detection unit 4 is not essential, and it is also possible to detect light from microparticles flowing through the flow path R by using an external photodetection device or the like.

In response to irradiation of microparticles with light from the light irradiation unit 3, the detection unit 4 detects light components such as fluorescence, forward-scattered light, side-scattered light, and backscattered light emitted from the microparticles. These fluorescence and necessary scattered light components are important light components in obtaining optical information (characteristics) of the microparticles.

The type of the detection unit 4 is not particularly limited as long as the detection unit 4 can detect light from microparticles. Thus, a publicly-known photodetector can be freely selected and adopted. For example, it is possible to use one of the following, or freely combine and use two or more of the following: a fluorescence measuring instrument, a scattered light measuring instrument, a transmitted light measuring instrument, a reflected light measuring instrument, a diffracted light measuring instrument, an ultraviolet spectrometer, an infrared spectrometer, a Raman spectrometer, a FRET measuring instrument, a FISH measuring instrument, various other spectrum measuring instruments, a so-called multichannel photodetector in which a plurality of photodetectors is arranged in an array, and the like.

Furthermore, in the present technology, the detection unit 4 may include a light receiving element that receives light emitted from the microparticles. Examples of the light receiving element include an area imaging element such as a CCD or a CMOS element, a photomultiplier tube (PMT), and a photodiode. In this case, the detection unit 4 can be configured such that the detection unit 4 includes a plurality of light receiving elements having different detection wavelength ranges. As a result of configuring the detection unit 4 such that the detection unit 4 includes the plurality of light receiving elements having different detection wavelength ranges, it is possible to measure the intensity of light in continuous wavelength ranges as a fluorescence spectrum. Specifically, a PMT array or photodiode array in which light receiving elements are one-dimensionally arranged and the one in which a plurality of independent detection channels is arranged, the detection channels each including, for example, a two-dimensional light receiving element such as a CCD or CMOS, can be cited as examples of the detection unit 4 configured in such a manner.

(6) Sorting Unit 5

The microparticle measuring apparatus 100 according to the present technology may further include the sorting unit 5 as necessary. The sorting unit 5 sorts target microparticles. Specifically, the sorting unit 5 includes at least, for example, a vibration element 5a, a charging unit 51, deflection plates 5b, and a collection container, as shown in FIGS. 1, 2, 6 to 8, and 12. The vibration element 5a generates droplets. The charging unit 51 charges the generated droplets. The deflection plates 5b change the courses of the charged droplets to a desired direction. The collection container is used for collecting the droplets.

More specifically, for example, in the microparticle measuring apparatus 100 according to each embodiment shown in FIGS. 1, 2, 6 to 8, and 12, the vibration element 5a applies vibration to an orifice of a microchip M to generate droplets. The charging unit 51 charges the droplets discharged from the orifice of the microchip M positively or negatively on the basis of a sorting control signal generated by the analysis unit 6. Then, the deflection plates (counter electrodes) 5b to which a voltage is applied change the courses of the charged droplets to a desired direction, so that the droplets are sorted.

Note that the vibration element 5a is not particularly limited, and a publicly-known element can be freely selected and used as the vibration element 5a. For example, a piezoelectric element or the like can be used. Furthermore, it is possible to adjust the size of droplets and generate droplets each containing a given number of microparticles by adjusting the amount of fluid fed to the flow path R, the diameter of a discharge port, the vibration frequency of the vibration element 5a, and the like.

Note that the sorting unit 5 is not essential in the microparticle measuring apparatus 100 according to the present technology, and the microparticle measuring apparatus 100 according to the present technology may be configured such that the microparticle measuring apparatus 100 performs only analysis of target microparticles, and does not perform the sorting of the target microparticles.

(7) Analysis Unit 6

The microparticle measuring apparatus 100 according to the present technology may further include the analysis unit 6 as necessary. The analysis unit 6 is connected to the detection unit 4, and analyzes detection values of light for microparticles detected by the detection unit 4.

For example, the analysis unit 6 corrects the detection value of light received from the detection unit 4 to calculate a feature amount of each microparticle. Specifically, the analysis unit 6 calculates feature amounts indicating the size, form, internal structure, and the like of microparticles from the detection values of received fluorescence or scattered light. Furthermore, the analysis unit 6 can also make a sorting determination on the basis of, for example, the calculated feature amounts and sorting conditions received from the input unit in advance, and generate a sorting control signal.

Note that the analysis unit 6 is not essential in the microparticle measuring apparatus 100 according to the present technology, and it is also possible to analyze the state and the like of the microparticles by using an external analysis device or the like on the basis of the detection values of light detected by the detection unit 4. For example, the analysis unit 6 may be implemented by a personal computer or a CPU. The analysis unit 6 can also be stored as a program in hardware resources including a recording medium (for example, a non-volatile memory (USB flash drive), an HDD, a CD, or the like) and the like, and be implemented by a personal computer or a CPU. Furthermore, the analysis unit 6 may be connected to each unit of the microparticle measuring apparatus 100 via a network.

(8) Storage Unit 7

The microparticle measuring apparatus 100 according to the present technology may further include the storage unit 7 as necessary. All items related to measurement such as the values detected by the detection unit 4, the feature amounts calculated by the analysis unit 6, the sorting control signal, and the sorting conditions input by the input unit are stored in the storage unit 7.

Note that the storage unit 7 is not essential in the microparticle measuring apparatus 100 according to the present technology, and an external storage device may be connected to the microparticle measuring apparatus 100. For example, a hard disk or the like can be used as the storage unit 7. Moreover, the storage unit 7 may be connected to each unit of the microparticle measuring apparatus 100 via a network.

(9) Display Unit 8

The microparticle measuring apparatus 100 according to the present technology may further include the display unit 8 as necessary. The display unit 8 displays all the items related to measurement such as the values detected by the detection unit 4 and the feature amounts calculated by the analysis unit 6. For example, the display unit 8 displays, as a scattergram, the feature amount for each microparticle calculated by the analysis unit 6.

Furthermore, the display unit 8 can display the state of connection between the first connector 1a and the joint portion 111α of the sheath fluid tube 111 and/or the state of connection between the second connector 1b and the joint portion 131β of the rinse liquid tube 131. Specifically, in a case where, for example, the state of connection with the joint portion 111α of the sheath fluid tube 111 is bad and/or the state of connection between the second connector 1b and the joint portion 131β of the rinse liquid tube 131 is bad, it is possible to display a GUI on the display unit 8 such that an alarm is displayed and a user is provided with information to the effect that the cleaning mode cannot be started.

Moreover, in a case where the microparticle measuring apparatus 100 according to the present technology includes the control unit 2, the display unit 8 can display a GUI that enables the measurement mode or the cleaning mode to be selected.

Note that the display unit 8 is not essential in the microparticle measuring apparatus 100 according to the present technology, and an external display device may be connected to the microparticle measuring apparatus 100. For example, a display, a printer, or the like can be used as the display unit 8.

(10) Input Unit 9

The microparticle measuring apparatus 100 according to the present technology may further include the input unit 9 as necessary. The input unit 9 is a part to be operated by a user such as an operator. The user accesses each control unit through the input unit 9, and controls each unit of the microparticle measuring apparatus 100. For example, the input unit 9 sets a region of interest on the scattergram displayed on the display unit, and determines sorting conditions.

Note that the input unit 9 is not essential in the microparticle measuring apparatus 100 according to the present technology, and an external operating device may be connected to the microparticle measuring apparatus 100. For example, a mouse, a keyboard, and the like can be used as the input unit 9.

(11) Insertion Unit 101

The microparticle measuring apparatus 100 according to the present technology may further include the insertion unit 101, as necessary. The insertion unit 101 is a part through which a substrate such as a microchip is inserted into the microparticle measuring apparatus 100 and set therein in a case where the flow path is formed in the substrate.

(12) Sample Feeding Unit 102

The microparticle measuring apparatus 100 according to the present technology may further include the sample feeding unit 102, as necessary. The sample feeding unit 102 feeds a sample to a sample introduction unit through a tube. For example, the sample liquid feeding unit 102 can suck a sample from a test tube, a well plate, or the like containing the sample through a nozzle and feed the sample. Alternatively, the sample feeding unit 102 can feed a sample by applying pressure to a storage unit in which a test tube or the like containing the sample can be stored.

(13) Drainage Unit 103

The microparticle measuring apparatus 100 according to the present technology may further include the drainage unit 103, as necessary. The drainage unit 103 is a part to which drainage is delivered through a tube. The drainage unit 103 may include, for example, a drainage tank or the like.

Note that the present technology can also adopt the following configurations.

(1)

A microparticle measuring apparatus including at least:

a relay unit that enables a flow path through which microparticles flow and a cleaning fluid storage unit to communicate with each other;

a sheath fluid tube that causes the flow path and a sheath fluid storage unit to communicate with each other; and a cleaning fluid tube that causes the relay unit and the cleaning fluid storage unit to communicate with each other, in which the relay unit includes:

a first connector that can be connected to a joint portion on the sheath fluid storage unit side of the sheath fluid tube.

(2)

The microparticle measuring apparatus according to (1), further including:

a control unit that controls switching between a measurement mode and a cleaning mode.

(3)

The microparticle measuring apparatus according to (2), further including:

a first confirmation mechanism that confirms a connection between the first connector and the joint portion on the sheath fluid storage unit side of the sheath fluid tube.

(4)

The microparticle measuring apparatus according to (3), in which the first confirmation mechanism includes an optical sensor.

(5)

The microparticle measuring apparatus according to (4), in which when the connection between the first connector and the joint portion on the sheath fluid storage unit side of the sheath fluid tube is confirmed by the first confirmation mechanism, switching to the cleaning mode is performed in the control unit.

(6)

The microparticle measuring apparatus according to any one of (3) to (5), further including:

a rinse liquid tube that causes the relay unit and a rinse liquid storage unit to communicate with each other, in which the relay unit enables the rinse liquid storage unit, the flow path, and the cleaning fluid storage unit to communicate with each other, and further includes a second connector that can be connected to a joint portion of the rinse liquid storage unit of the rinse liquid tube.

(7)

The microparticle measuring apparatus according to (6), further including:

a second confirmation mechanism that confirms a connection between the second connector and the joint portion on the rinse liquid storage unit side of the rinse liquid tube.

(8)

The microparticle measuring apparatus according to (7), in which the second confirmation mechanism includes an optical sensor.

(9)

The microparticle measuring apparatus according to (7) or (8), in which when the connection between the first connector and the joint portion on the sheath fluid storage unit side of the sheath fluid tube is confirmed by the first confirmation mechanism and the connection between the second connector and the joint portion on the rinse liquid storage unit side of the rinse liquid tube is confirmed by the second confirmation mechanism, switching to the cleaning mode is performed in the control unit.

(10)

The microparticle measuring apparatus according to any one of (6) to (9), in which the first connector and the second connector have different shapes.

(11)

The microparticle measuring apparatus according to any one of (6) to (10), further including:

a display unit that displays:

a state of connection between the first connector and the joint portion on the sheath fluid storage unit side of the sheath fluid tube, and/or a state of connection between the second connector and the joint portion on the rinse liquid storage unit side of the rinse liquid tube.

(12)

The microparticle measuring apparatus according to any one of (6) to (11), in which a distance from a connecting portion of the sheath fluid storage unit with the sheath fluid tube to the second connector is greater than a length of the sheath fluid tube.

(13)

The microparticle measuring apparatus according to any one of (6) to (12), in which a distance from a connecting portion of the rinse liquid storage unit with the rinse liquid tube to the first connector is greater than a length of the rinse liquid tube.

(14)

The microparticle measuring apparatus according to any one of (1) to (13), in which the cleaning fluid tube includes branch tubes that extend to a plurality of the cleaning fluid storage units.

(15)

The microparticle measuring apparatus according to (14), further including:

a plurality of the cleaning fluid storage units.

(16)

The microparticle measuring apparatus according to any one of (1) to (15), in which the cleaning fluid is a cleaning agent or a bactericide.

(17)

The microparticle measuring apparatus according to (16), in which the cleaning agent is an ethanol fluid.

(18)

The microparticle measuring apparatus according to (16), in which the bactericide is a sodium hypochlorite fluid or a paraformaldehyde fluid.

REFERENCE SIGNS LIST

100 Microparticle measuring apparatus
11 Sheath fluid storage unit
111 Sheath fluid tube
12, 12a, 12b Cleaning fluid storage unit
121 Cleaning fluid tube
13 Rinse liquid storage unit
131 Rinse liquid tube
10 Optical sensor
2 Control unit
3 Light irradiation unit
4 Detection unit
5 Sorting unit
6 Analysis unit
7 Storage unit
8 Display unit
9 Input unit
101 Insertion unit
102 Sample feeding unit
103 Drainage unit
M Microchip

The invention claimed is:

1. A microparticle measuring apparatus, comprising:
a relay unit configured to enable a flow path to communicate with a cleaning fluid storage tank,
wherein microparticles flow through the flow path;
a sheath fluid tube configured to cause the flow path to communicate with a sheath fluid storage tank; and
a cleaning fluid tube configured to cause the relay unit to communicate with the cleaning fluid storage tank,
wherein the sheath fluid tube having an end having a joint portion is directly connectable to a first connector of the relay unit, and the joint portion of the sheath fluid tube is also directly connectable to a side of the sheath fluid storage tank.

2. The microparticle measuring apparatus according to claim 1, further comprising a central processing unit (CPU) configured to control switching of a mode of the microparticle measuring apparatus between a measurement mode and a cleaning mode.

3. The microparticle measuring apparatus according to claim 2, further comprising a first optical sensor configured to confirm the connection between the first connector and the joint portion of the sheath fluid tube.

4. The microparticle measuring apparatus according to claim 3, wherein when the connection between the first connector and the joint portion of the sheath fluid tube is confirmed by the first optical sensor, the CPU is further configured to switch the mode of the microparticle measuring apparatus to the cleaning mode.

5. The microparticle measuring apparatus according to claim 3, further comprising a rinse liquid tube configured to cause the relay unit to communicate with a rinse liquid storage tank, wherein
the relay unit is further configured to enable communication between the rinse liquid storage tank, the flow path, and the cleaning fluid storage tank, and
the relay unit further includes a second connector that is connected to a joint portion of a rinse liquid storage tank side of the rinse liquid tube.

6. The microparticle measuring apparatus according to claim 5, further comprising a second optical sensor configured to confirm the connection between the second connector and the joint portion on the rinse liquid storage tank side of the rinse liquid tube.

7. The microparticle measuring apparatus according to claim 6, wherein when the connection between the first connector and the joint portion of the sheath fluid tube is confirmed by the first optical sensor and the connection between the second connector and the joint portion on the rinse liquid storage tank side of the rinse liquid tube is confirmed by the second optical sensor, the CPU is further configured to switch the mode of the microparticle measuring apparatus to the cleaning mode.

8. The microparticle measuring apparatus according to claim 5, wherein the first connector and the second connector have different shapes.

9. The microparticle measuring apparatus according to claim 5, further comprising a display configured to display:

a state of the connection between the first connector and the joint portion of the sheath fluid tube, and
a state of the connection between the second connector and the joint portion on the rinse liquid storage tank side of the rinse liquid tube.

10. The microparticle measuring apparatus according to claim 5, wherein a distance from a connecting portion of the sheath fluid storage tank with the sheath fluid tube to the second connector is greater than a length of the sheath fluid tube.

11. The microparticle measuring apparatus according to claim 5, wherein a distance from a connecting portion of the rinse liquid storage tank with the rinse liquid tube to the first connector is greater than a length of the rinse liquid tube.

12. The microparticle measuring apparatus according to claim 1, wherein the cleaning fluid tube includes a plurality of branch tubes that extend to a plurality of cleaning fluid storage tanks, the plurality of cleaning fluid storage tanks include the cleaning fluid storage tank.

13. The microparticle measuring apparatus according to claim 12, further comprising the plurality of the cleaning fluid storage tanks.

14. The microparticle measuring apparatus according to claim 1, wherein a cleaning fluid flows from the cleaning fluid storage tank through the sheath fluid tube; and the cleaning fluid is at least one of a cleaning agent or a bactericide.

15. The microparticle measuring apparatus according to claim 14, wherein the cleaning agent is an ethanol fluid.

16. The microparticle measuring apparatus according to claim 14, wherein the bactericide is one of a sodium hypochlorite fluid or a paraformaldehyde fluid.

17. A microparticle measuring apparatus, comprising:

a relay unit configured to enable a flow path to communicate with a cleaning fluid storage tank,
wherein microparticles flow through the flow path;

a sheath fluid tube configured to cause the flow path to communicate with a sheath fluid storage tank;

a cleaning fluid tube configured to cause the relay unit to communicate with the cleaning fluid storage tank,
wherein the sheath fluid tube having an end having a joint portion is directly connectable to a first connector of the relay unit, and the joint portion of the sheath fluid tube is also directly connectable to a side of the sheath fluid storage tank;

a first optical sensor configured to confirm the connection between the first connector and the joint portion of the sheath fluid tube; and a central processing unit (CPU) configured to control switching of a mode of the microparticle measuring apparatus between a measurement mode and a cleaning mode.

* * * * *